United States Patent

Sasaki et al.

[15] 3,674,078

[45] July 4, 1972

[54] PNEUMATIC TIRE WITH POLYESTER CASING, NYLON BREAKER AND STEREO REGULAR POLYBUTADIENE

[72] Inventors: Shiro Sasaki; Narajiro Shibata, both of Osaka, Japan

[73] Assignee: The Toyo Rubber Industry Co., Ltd., Osaka, Japan

[22] Filed: Dec. 2, 1968

[21] Appl. No.: 780,586

[30] Foreign Application Priority Data

Dec. 1, 1967 Japan.................................42/77228

[52] U.S. Cl..............................152/330, 152/354, 152/361, 260/5, 260/41.5 R, 260/894
[51] Int. Cl.........................................B60c 1/00, C08d 9/16
[58] Field of Search..................260/894, 41.5; 152/330, 361

[56] References Cited

UNITED STATES PATENTS

| | | | |
|---|---|---|---|
| 3,157,218 | 11/1964 | Brown | 152/330 |
| 3,280,876 | 10/1966 | Snow | 152/330 |
| 3,363,659 | 1/1968 | Keckler et al | 152/330 |
| 3,363,660 | 1/1968 | Mirtaw et al | 152/353 |
| 3,400,099 | 9/1968 | Cook | 260/45.85 |
| 3,548,910 | 12/1970 | Sperberg | 152/359 |

*Primary Examiner*—Samuel H. Blech
*Assistant Examiner*—J. Seibert
*Attorney*—Sughrue, Rothwell, Mion, Zinn & Macpeak

[57] ABSTRACT

A tire comprising a polyester casing ply cord, a nylon breaker or cap ply cord, the breaker or cap ply consisting of at least two layers, the rubber used in the above plies being vulcanizable and comprising at least 20 percent stereo-regular polybutadiene or stereo-regular styrene-butadiene containing carbon black. The tread is formed of a vulcanizable rubber containing specific proportions of stereo-regular polybutadiene or stereo-regular styrene-butadiene rubber containing carbon black with a maximum particle size. High speed durability is greatly improved.

7 Claims, No Drawings

3,674,078

PNEUMATIC TIRE WITH POLYESTER CASING, NYLON BREAKER AND STEREO REGULAR POLYBUTADIENE

BACKGROUND OF THE INVENTION

1. Field of the Invention

This invention relates to an improvement in the high speed durability of pneumatic tires by utilizing a new and novel combination of special materials for forming the casing ply, breaker or cap ply and other reinforcing ply cords, and to special materials for use as ply cord rubber and tread rubber.

Description of the Prior Art

Hitherto known tires in which rayon tire cord has been used in the casing ply has many defects in comparison to tires in which a nylon tire cord has been used in the casing ply. For instance, in rayon casings, it is easy to cause ply separation, due to the action of repeated stress during running; or by penetration of water and/or mud from a gash when the tire is injured, which leads to tread separation upon high speed running.

Although such defects (in rayon tires) are somewhat corrected in the case of nylon tires, tires in which nylon cord is used in the casing ply have the defect that they are poor in dimensional stability and exhibit a great change in dimensions with changes in season and with conditions of manufacture, when compared with rayon tires. In addition, nylon tires encounter "flat spotting" which causes abnormal vibration of the car on driving after parking for relatively long periods of time.

Moreover, tires in which nylon cord is used in the casing ply have the defect that the strength, especially of inner ply cord, will be deteriorated to a great extent during tire vulcanization and/or post inflation.

Although it is possible to obtain tires of a relatively good quality which are free from such defects as are found in rayon or nylon tires by using polyester tire cord in the casing ply, tires thus obtained are superior in their high speed durability compared to rayon tires, but are inferior to nylon tires.

SUMMARY OF THE INVENTION

The present invention comprises a novel and unique combination of materials utilized to build up a tire, the resulting tire having properties illustrating a vast improvement over the prior art.

Specifically, the elements set out below, formed of the specific materials recited, must be combined to form a tire which illustrates the improved properties of the present invention. The tire tread is formed from a tread rubber compound comprising 100 parts by weight of a rubber compound of at least 20 percent by weight stereo-regular polybutadiene or stereo-regular styrene-butadiene rubber, having incorporated therein 40–100 parts by weight of a furnace carbon black having a mean particle size not exceeding 30 m$\mu$.

A rubber compound utilized in the ply cords, i.e., the casing ply and the breaker or cap ply, comprises 100 parts of a rubber component of which at least 20 percent by weight is a stereo-regular polybudiene rubber or a stereo-regular styrene-butadiene rubber having incorporated therein 20–80 parts by weight of a furnace carbon black.

The tire cords are formed as follows: a nylon cord must be utilized for the breaker or cap ply cord; a polyester cord must be utilized as the casing poly cord.

The tire is generally produced utilizing standard state-of-the art procedures.

It is thus an object of the present invention to provide a unique and novel combination of materials which, when utilized to form a pneumatic tire, do not illustrate defects heretofore encountered in the prior art such as ply separation, tread separation upon high speed travel and poor dimensional stability.

It is a further object of the present invention to provide a tire formed from a very specific and novel combination of materials which illustrates greatly improved high speed durability and a reduced tendency for breaker edge tread separation.

DESCRIPTION OF THE PREFERRED EMBODIMENTS

We have found, as a result of many tests on combinations of various materials with respect to compounds used in treads, breaker and casing plies, casing ply cords and breaker or cap ply cords, to correct the above defects, a combination of materials which gives a tire with a greatly improved high speed durability. The lack of any elements of the combination of the present invention will result in a tire of poor high speed durability, and it has been found that all of the elements cooperate to yield the improved combination of the present invention.

Each of the elements of the combination of the present invention will not be explained in detail.

The tread rubber compound used in the present invention comprises 100 parts by weight of a rubber component of which at least 20 percent by weight is a stereo-regular polybutadiene rubber or a stereo-regular styrene-butadiene rubber having incorporated therein 40–100 parts by weight of a furnace carbon black of a mean particle size not exceeding 30 m$\mu$. As other ingredients, any of the conventional compounding ingredients for formulating a tread rubber compound may be incorporated in their conventional amount.

Although it is well known that such a tread rubber compound has a low tendency for heat build-up, good groove-cracking resistance and abrasion resistance, a process for developing such properties to a great extent has not been developed. According to the present invention, a tire having an excellent high speed durability is obtainable by an exact combination of materials for all sections of the tire, and the proper combinations thereof.

The rubber compound utilized for the ply cords, i.e. the casing ply and the breaker or cap ply, must be a vulcanizable rubber compound with a low heat build-up property and an excellent thermal aging resistance, comprising 100 parts of a rubber component of which at least 20 percent by weight is a stereo-regular polybutadiene rubber or a stereo-regular styrene-butadiene rubber having incorporated therein 20–80 parts by weight of a furnace carbon black.

With respect to the tire cords, a nylon cord must be used for the breaker or cap ply cord to improve the quality of the tire. It has been proven that although nylon cord is inadequate as a casing ply cord because of its poor dimensional stability, it serves excellently as a breaker or cap ply because of its excellent adhesion and impact strength, in view of the fact that dimensional stability is inconsequential in a breaker or cap ply.

As the casing ply cord there is used a polyester cord. From the viewpoint of stress dissipation and minimization of the cross-sectional area of cord at the edge of the breaker, it is desirable to use as the breaker or cap ply cord a nylon cord which is smaller in denier than the polyester cord used as the casing ply. This is necessary in order to obtain a tire having improved high speed durability which also has a reduced tendency for tread separation starting at the breaker edge.

The present invention will now be illustrated in greater detail by the following examples.

EXAMPLE 1:

Pneumatic tires of a tire size of 7.00–13 (4 PR) were built up from the materials or members as hereinafter described. A high speed durability test was performed on the tires obtained by means of a drum running tester.

The "building members" utilized to form the tire of the present invention are as follows:
a. Tread compound:

The recipe of a tread compound in accordance with the present invention is listed in column No. 1 in Table 1. The recipe listed in column No. 2 is a control incorporating no stereo-regular rubber.

TABLE 1

| Recipe | No. 1 | No. 2 |
| --- | --- | --- |

| | | |
|---|---|---|
| SBR 1712 (1) | 89.4 | 137.5 |
| BR–31 (2) | 48.1 | — |
| ISAF black (3) | 75.0 | 75.0 |
| Zinc white | 5.0 | 5.0 |
| Stearic acid | 2.0 | 2.0 |
| High aromatic process oil | 5.0 | 5.0 |
| Microcrystalline wax | 2.0 | 2.0 |
| Nocrac 810 NA (4) | 1.5 | 1.5 |
| Nocceler MSA (5) | 1.0 | 1.0 |
| Sulfur | 1.8 | 1.8 |
| Total | 230.8 | 230.8 |

Note: (1) Oil-extended styrene butadiene rubber (staining) containing 37.5 parts of a high aromatic oil.
(2) Oil-extended cis-polybutadiene rubber containing 37.5 parts of oil (non-staining).
(3) Furnace black of International Super Abrasion Furnace Black grade, mean particle size 21 mµ.
(4) Antioxidant N-phenyl-N-isopropyl-p-phenylenediamine.
(5) Accelerator N-oxydiethylene-2-benzothiazylsulfenamide.

b. Casing ply and breaker compound:

A recipe for a casing ply and breaker compound according to the present invention is listed in column No. 3 in Table 2. The recipe listed in column No. 4 is a control having incorporated therein no stereo-regular rubber.

TABLE 2

| Recipe No. | No. 3 | No. 4 |
|---|---|---|
| Natural rubber (RSS No. 3) | 70.0 | 70.0 |
| SBR 1778 (1) | — | 41.25 |
| BR–21 (2) | 41.25 | — |
| FEF black (3) | 40.0 | 40.0 |
| Zinc white | 5.0 | 5.0 |
| Stearic acid | 2.0 | 2.0 |
| High aromatic process oil | 5.0 | 5.0 |
| Nocrac SP (4) | 1.5 | 1.5 |
| Nocceler–DM (5) | 0.6 | 0.6 |
| Sulfur | 3.5 | 3.5 |
| Total | 168.85 | 168.85 |

Note: (1 Non-staining oil-extended styrene-butadiene rubber with a styrene content of 23.5%, having incorporated therein 37.5 parts of naphthenic oil.
(2) Non-staining oil-extended (37.5 parts) cis-polybutadiene rubber.
(3) Furnace black of Fast Extrusion Furnace Black degree, mean particle size 35 mµ.
4) Antioxidant Styrenated phenol.
(5) Accelerator Dibenzothiazyl disulfide.

c. Casing ply cord:

In this example, there was used a polyester tire cord of 1,000 d/3 to form a casing ply in accordance with the present invention. For comparison, a rayon tire cord of 1,650 d/2 and a nylon tire cord of 1,260 d/2 were used.

d. Breaker cord:

In this example, a nylon tire cord of 840 d/2 was used for the breaker cord in accordance with the present invention. For comparison, a polyester tire cord of 1,000 d/3 was used.

The constituents of pneumatic tires (A to H), built up with constituent members (a), (b), (c), and (d) (described above), are indicated in Table 3.

TABLE 3

| Tire | Tread compound (a), recipe number | Breaker compound (b), recipe number | Casing ply cord (c) Material | Ply | Breaker ply cord (d) Material | Ply |
|---|---|---|---|---|---|---|
| A | 1 | 3 | Ester | 2 | Nylon | 1 |
| B | 2 | 4 | Rayon | 4 | do | 1 |
| C | 2 | 4 | Ester | 2 | Ester | 1 |
| D | 2 | 3 | do | 2 | Nylon | 1 |
| E | 1 | 3 | do | 2 | Ester | 1 |
| F | 1 | 3 | Nylon | 2 | Nylon | 1 |
| G | 1 | 3 | Rayon | 4 | do | 1 |
| H | 1 | 4 | Ester | 2 | do | 1 |

NOTE: In the above table, tire A was formulated in accordance with the present invention.

Two of each of the above tires were subjected to a drum test to compare the high speed durabilities thereof. The results are indicated in Table 5.

The drum test conditions which were utilized are in Table 4. After "pre-running" at a speed of 80 Km/hr for 2 hours, the speed was incrementally increased every 30 minutes to 120 Km/hr. The speed at which the tires failed and the running time at the same speed were recorded.

TABLE 4

| Running time (hr.) | 2.0 | ½ | ½ | ½ | ½ | ½ | ½ | ½ | ½ | ½ |
|---|---|---|---|---|---|---|---|---|---|---|
| Speed (Km/hr.) | 80 | 120 | 128 | 144 | 152 | 160 | 168 | 176 | 184 | 192 | 200 |
| Inner pressure | 2.1 Kg/cm² | | | | | | | | | |
| Load | 425 Kg | | | | | | | | | |

TABLE 5

| Tire | Speed at which tire failed (Km/hr.) | Running time at the same speed (min.) | Details of the failure when the drum tester stopped. |
|---|---|---|---|
| A | 184 | 15 | tread separation |
| A | 192 | 3 | tread separation, burst |
| B | 160 | 6 | tread separation |
| B | 160 | 12 | groove crack to chunk out |
| C | 160 | 27 | tread separation |
| C | 160 | 4 | chunk out |
| D | 160 | 25 | groove crack to chunk out |
| D | 168 | 8 | groove crack to chunk out |
| E | 168 | 7 | tread separation |
| E | 160 | 26 | tread separation |
| F | 184 | 11 | groove crack to chunk out |
| F | 176 | 3 | groove crack to chunk out |
| G | 168 | 22 | tread separation to burst |
| G | 168 | 25 | tread separation |
| H | 184 | 4 | tread separation |
| H | 176 | 20 | tread separation |

The results summarized in the Table 5 indicate that the tire of the present invention (Tire A) has a very good high speed performance, as shown by its durability at speeds of 184 to 192 Km/hr. On the other hand, tire D which had a different tread compound; tires E, F, and G, which had a different combination of the casing cord and breaker cord; tires B and C, which had a different rubber compound and cord; and tire H which had a different casing rubber compound and breaker rubber compound, are inferior to the tire of the present invention. On tires (A), (D) and (F), temperature measurements were carried out under an overload of 40 percent. The temperatures of the crown center portion and the shoulder portion in the tread surface adjacent to the casing cord) were measured after running under a load of 595 Kg at a speed of 65 Km/hr. for 24 hours. The results are summarized in Table 6.

TABLE 6

| Tire | Crown Center portion (° C.) | Shoulder portion (°C.) |
|---|---|---|
| A | 78 | 102 |
| D | 83 | 111 |
| F | 80 | 104 |

The above table indicates that the tire of the present invention illustrates a very low heat build-up. This low heat build-up insures there will not be any harmful effect on the adhesion of the tire cords, the aging of the rubber compounds and other characteristics, and, consequently on the life of the tire.

EXAMPLE 2:

Tires were built up using a polyester cord for the casing ply cord, a nylon or polyester cord for the breaker cord, and a stereo-regular styrene-butadiene rubber or an emulsion polymerized styrene-butadiene rubber for tread compound. The tire size was 6.15–14, 4 PR.

a. Tread compound:

The recipes utilized are illustrated in Table 7. The recipes were the same as those illustrated in Table 1 with the exception of the composition of the rubber and process oil.

TABLE 7

| Recipe No. | No. 5 | No. 6 | No. 7 |
| --- | --- | --- | --- |
| SBR 1712 | — | — | 137.5 |
| Diene NF35 (1) | — | 20.0 | — |
| Tufdene 1530 (2) | 137.5 | 110.0 | — |
| High aromatic process oil | — | 7.5 | — |

Note; (1) So called "Diene Rubber" of a high trans-1,4 content. (2) Stereo-regular styrene butadiene rubber, called "Solution SBR."

b. Casing ply and breaker compound:

The compound of the recipe in Table 8 was used for every tire.

TABLE 8

| Natural rubber (RSS 03) | 40.0 |
| --- | --- |
| Tufdene 2630 (1) | 82.5 |
| FEF black | 63.0 |
| Zinc white | 4.0 |
| Stearic acid | 2.0 |
| Piccopale 100SF (2) | 6.0 |
| Nocrac SP | 1.5 |
| Nocceler DM | 0.9 |
| Sulfur | 3.0 |
| Total | 209.9 |

Note: (1) Stereo-regular styrene-butadiene rubber with 37.5 parts of a naphthenic process oil added thereto.
(2) Petroleum resin, softening point 100° C.

c. Casing ply cord:

A polyester cord of 1,100 d/3 was used.

d. Breaker cord:

A polyester cord of 1,100 d/3 and a nylon cord of 840 d/2 were used.

The combinations of the above materials, which were utilized, or members, are shown in Table 9. All the casing plies were 2 ply.

TABLE 9

| Tire | Tread compound | Casing ply cord | Breaker cord |
| --- | --- | --- | --- |
| I No. 5 | | Ester | Ester |
| J No. 6 | | Ester | Nylon |
| K No. 7 | | Ester | Nylon |
| L No. 5 | | Ester | Nylon |

Two of each tire listed in Table 9 were subjected to drum running tests for the measurement of their high speed durability, and the results obtained are summarized in Table 10. The test conditions were the same as those in Example 1 with the exception that the inner pressure was 2.6 Kg/cm².

TABLE 10

| Tire | Speed at which tire failed (Km/hr.) | Running time at the same speed (min.) | Details of the failure when the drum tester stopped |
| --- | --- | --- | --- |
| I | 168 | 22 | Tread separation |
| I | 176 | 17 | Tread separation |
| J | 200 | (1200) | Unfailured |
| J | 200 | (1200) | Unfailured |
| K | 168 | 29 | Chunk out |
| K | 184 | 3 | Groove crack to tread separation |
| L | 200 | (1200) | Unfailured |
| L | 192 | 24 | Groove crack to tread separation |

As is evident from the results summarized in the above table, the tire having a polyester cord casing ply and a nylon cord breaker in accordance with the present invention stood, under the above test conditions, high speed running at a speed of 200 Km/hr.

What is claimed is:

1. A pneumatic tire comprising:
   a. a polyester casing ply cord,
   b. at least two layers of a nylon breaker or nylon cap ply cord, each layer comprising said nylon cord and a rubber comprising a rubber compound comprising 100 parts by weight of a rubber component comprising at least 20 percent of a member selected from the group consisting of stereo regular cis-polybutadiene rubber and stereo regular styrene-butadiene rubber, said rubber having incorporated therein, from about 20 to about 80 parts by weight of a furnace carbon black and
   c. a tread formed of a rubber compound comprising 100 parts by weight of a rubber component comprising at least 20 percent by weight of a member selected from the group consisting of stereo regular cis-polybutadiene rubber and stereo regular styrene butadiene rubber, said rubber having incorporated therein from about 40 to about 100 parts by weight of a furnace carbon black, having a mean particle size not greater than 30 millimicrons.

2. The tire of claim 1 in which the tread rubber compound comprises a rubber component containing from about 70 to about 100 percent by weight of a stereo regular cis-styrene-butadiene rubber.

3. The tire of claim 1 in which the rubber compound utilized in the casing ply and the breaker or cap ply comprises a rubber component containing from about 20 to about 70 percent by weight of a stereo regular cis-styrene butadiene rubber.

4. The tire of claim 1 in which all rubber compounds comprise a rubber component containing from about 20 to about 60 percent by weight of a cis-polybutadiene rubber.

5. The tire of claim 1 in which all rubber compounds comprise a rubber component containing from about 20 to about 100 percent by weight of a stereo regular cis-styrene-butadiene rubber.

6. The tire of claim 1 in which the rubber compound utilized in the tread comprises a rubber component comprising from about 20 to about 60 percent by weight of a cis-polybutadiene rubber and from about 80 to about 40 percent by weight of a cis-styrene-butadiene rubber.

7. The tire of claim 1 in which the rubber compound utilized to form the casing ply and the breaker or cap ply comprises a rubber component comprising from about 20 to about 70 percent by weight of a member selected from the group consisting of cis-polybutadiene rubber and a stereo regular cis-styrene-butadiene rubber, and from about 80 to about 30 percent by weight natural rubber.

* * * * *